(12) United States Patent
Phaneuf et al.

(10) Patent No.: US 7,224,278 B2
(45) Date of Patent: May 29, 2007

(54) LABEL WITH ELECTRONIC COMPONENTS AND METHOD OF MAKING SAME

(75) Inventors: Peter Phaneuf, Sparta, MI (US); Gary P. Burns, Rockford, MI (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/276,713

(22) Filed: Mar. 10, 2006

(65) Prior Publication Data
US 2007/0085685 A1     Apr. 19, 2007

Related U.S. Application Data

(60) Provisional application No. 60/596,742, filed on Oct. 18, 2005.

(51) Int. Cl.
  *G08B 13/14* (2006.01)
(52) U.S. Cl. ................. 340/572.1; 340/572.2; 340/572.3
(58) Field of Classification Search ............ 340/572.1, 340/572.2, 572.3, 572.4, 572.5, 572.6, 572.7, 340/572.8
See application file for complete search history.

(56) References Cited

U.S. PATENT DOCUMENTS

| | | | |
|---|---|---|---|
| 5,315,753 A | | 5/1994 | Jensen et al. |
| 5,528,222 A | | 6/1996 | Moskowitz et al. |
| 5,598,032 A | | 1/1997 | Fidalgo |
| 5,654,693 A | | 8/1997 | Cocita |
| 5,867,102 A | * | 2/1999 | Souder et al. ........... 340/572.8 |
| 5,950,304 A | | 9/1999 | Khandros et al. |
| 5,955,949 A | | 9/1999 | Cocita |
| 5,999,409 A | | 12/1999 | Ando et al. |
| 6,036,099 A | | 3/2000 | Leighton |
| 6,058,017 A | * | 5/2000 | Horejs et al. ............... 361/737 |
| 6,259,408 B1 | | 7/2001 | Brady et al. |
| 6,262,692 B1 | * | 7/2001 | Babb .......................... 343/895 |

(Continued)

FOREIGN PATENT DOCUMENTS

JP         8052968         2/1996

(Continued)

*Primary Examiner*—Jeffery Hofsass
*Assistant Examiner*—Edny Labbees
(74) *Attorney, Agent, or Firm*—Renner, Otto, Boisselle & Sklar, LLP

(57) ABSTRACT

A method of making an electronic label, such as an RFID label, includes attaching a circuit, such as an antenna, to a substrate material, applying an adhesive layer to the substrate material over the circuit, adding a release layer over the adhesive layer, forming at least one opening in the release layer to expose at least one portion of the circuit, and connecting a microchip to the at least one portion of the circuit through the at least one opening. The electronic label includes a substrate having on one surface a circuit including at least one microchip, a layer of adhesive covering the circuit and the one surface of the substrate, and a release layer covering the adhesive layer. The circuit can be an RFID inlay, including an antenna and a microchip, and can be formed of a conductive ink. A portion of the release layer at the at least one microchip has an opening to expose the at least one microchip so that the at least one microchip is free from coverage by the release layer.

38 Claims, 3 Drawing Sheets

U.S. PATENT DOCUMENTS

| | | |
|---|---|---|
| 6,265,977 B1* | 7/2001 | Vega et al. .............. 340/572.7 |
| 6,343,019 B1 | 1/2002 | Jiang et al. |
| 6,390,375 B2 | 5/2002 | Kayanakis |
| 6,429,831 B2 | 8/2002 | Babb |
| 6,437,985 B1 | 8/2002 | Blanc et al. |
| 6,460,245 B1 | 10/2002 | DiStefano |
| 6,497,371 B2* | 12/2002 | Kayanakis et al. ......... 235/492 |
| 6,512,302 B2 | 1/2003 | Mess et al. |
| 6,522,308 B1 | 2/2003 | Mathieu |
| 6,546,620 B1 | 4/2003 | Juskey et al. |
| 6,575,374 B1 | 6/2003 | Boyadjian et al. |
| 6,684,503 B1 | 2/2004 | Silverbrook et al. |
| 6,687,986 B2 | 2/2004 | White |
| 6,770,509 B2 | 8/2004 | Halope et al. |
| 6,786,419 B2 | 9/2004 | Kayanakis |
| 6,836,215 B1* | 12/2004 | Laurash et al. .......... 340/572.1 |
| 6,851,617 B2 | 2/2005 | Saint et al. |
| 6,851,618 B2 | 2/2005 | Halope |
| 6,888,509 B2 | 5/2005 | Atherton |
| 6,908,786 B2 | 6/2005 | Halope |
| 6,951,596 B2 | 10/2005 | Green |
| 7,025,259 B2 | 4/2006 | Mausy |
| 7,037,556 B2 | 5/2006 | Jaynes |
| 2001/0002035 A1 | 5/2001 | Kayanakis |
| 2001/0014377 A1 | 8/2001 | Babb et al. |
| 2002/0036237 A1* | 3/2002 | Atherton et al. ............ 235/492 |
| 2003/0145945 A1* | 8/2003 | Kennedy .................... 156/289 |
| 2004/0040740 A1 | 3/2004 | Nakatani et al. |
| 2004/0061994 A1 | 4/2004 | Kerr et al. |
| 2004/0062016 A1 | 4/2004 | Kerr et al. |
| 2004/0108922 A1* | 6/2004 | Ammar et al. .............. 333/246 |
| 2004/0169086 A1* | 9/2004 | Ohta et al. .................. 235/492 |
| 2004/0215350 A1 | 10/2004 | Roesner |
| 2005/0035924 A1 | 2/2005 | Liu et al. |
| 2005/0066513 A1 | 3/2005 | Kayanakis et al. |
| 2005/0198811 A1 | 9/2005 | Kurz et al. |
| 2005/0206524 A1 | 9/2005 | Forster et al. |
| 2005/0275540 A1 | 12/2005 | Halope et al. |
| 2005/0282495 A1 | 12/2005 | Forster |
| 2006/0125641 A1* | 6/2006 | Forster .................... 340/572.8 |
| 2006/0290498 A1 | 12/2006 | Rawlings et al. |

FOREIGN PATENT DOCUMENTS

| | | |
|---|---|---|
| JP | 2003/288568 | 10/2003 |
| JP | 2004/118844 | 4/2004 |
| JP | 2006/059373 | 3/2006 |
| JP | 2006/127471 | 5/2006 |
| WO | WO 00/26856 | 5/2000 |
| WO | 2004088582 | 10/2004 |
| WO | WO 2005/057483 | 6/2005 |

* cited by examiner

LABEL WITH ELECTRONIC COMPONENTS AND METHOD OF MAKING SAME

CROSS-REFERENCE TO RELATED APPLICATION

This application claims the benefit of U.S. provisional application Ser. No. 60/596,742, filed Oct. 18, 2005, which is incorporated herein in its entirety.

BACKGROUND OF THE INVENTION

1. Field of the Invention

The invention relates generally to a label incorporating an electronic component. In one of its aspects, the invention relates to a label incorporating an electronic component. In another of its aspects, the invention relates to a method of making a label with electronic components. In yet another of its aspects, the invention relates to a label that incorporates an RFID circuit. In another of its aspects, the invention relates to a method of making a label having an RFID circuit.

2. Description of the Related Art

The use of a radio frequency identification (RFID) to identify one of a plurality of items is well known. Typical radio frequency identification (RFID) tags or integrated circuits comprise a microprocessor, also known as a microchip, electrically connected to an antenna. Alternatively, the microchip is first attached to a pad having electrical leads that provides a larger attachment or "landing" area. This is typically referred to as a "strap" or "interposer." The strap is then attached to the antenna.

The microprocessor stores data, which can include identifying data unique to a specific item, which is transmitted to an external receiver for reading by an operator and processing of the item. RFID tags can be attached to items for inventory control, shipment control, and the like. RFID tags are particularly useful in identifying, tracking, and controlling items such as packages, pallets, and other product containers. The location of each item can be tracked, and information identifying the owner of the item or specific handling requirements, can be encoded into the RFID and later read by a scanning device capable of decoding and displaying the information.

RFID tags have been incorporated into a pressure sensitive adhesive-backed label for items contained in temporary packaging, such as cardboard cartons, or containers which are to undergo a number of reuses, such as pallets, waste containers, shipment containers, and the like. These labels are conventionally fabricated by attaching an antenna made of metal foil, conductive ink, or other suitable material, to a substrate material such as paper, film, and the like, also referred to as an "inlay substrate." A microprocessor or strap is attached to the substrate in cooperative disposition with the antenna to form what is typically referred to as an "inlay." An adhesive is then applied to the surface of the inlay substrate over the antenna and microprocessor, and the inlay substrate is attached to a label substrate, on which text and graphics can be imprinted, so that the adhesive, antenna, and microprocessor are sandwiched between the inlay substrate and the label substrate. A layer of adhesive is then applied to the surface of the label substrate over the inlay, followed by the addition of a release layer over the adhesive. The laminate can then be die cut to the finished label size. Printing of a bar code or other information, text, and graphics onto the finished label, and coding of the microprocessor, can take place before or after the die cutting step. The labels are then wound tightly onto a spool, or processed into a fan-fold configuration, for shipment to a customer or return to the electronic manufacturer or marketer. The application of the inlay to the paper is usually carried out by an electronic manufacturer and the remaining steps are typically carried out by a label manufacturer.

The handling of the inlay during this label-making process imposes stresses on the inlay which can result in damage to the microprocessor. In addition, the inlay can be subject to electrical fields or discharges during the manufacturing process that damage the microchip. Thus, a fairly high level of scrap has been generated by the current label-making process. Since the microprocessor is typically the most costly component, minimizing the incidence of damaged microprocessors is highly desirable to reducing the scrap rate.

SUMMARY OF THE INVENTION

According to the invention, a method of making an electronic label comprises the steps of attaching a circuit to a substrate, applying an adhesive layer to the substrate over at least a portion of the circuit, applying a release layer over the adhesive layer and forming at least one opening in the release layer to expose at least one portion of the circuit.

In one embodiment, the invention further comprises the steps of depositing at least one microchip in the at least one opening, and attaching the at least one microchip to the at least one circuit portion.

In one embodiment, the step of forming at least one opening in the release layer comprises forming multiple openings in the release layer and the step of a depositing at least one microchip comprises depositing a microchip in each of the multiple openings In one embodiment, the circuit includes an antenna and the microchip is an RFID chip.

In one embodiment, the invention further comprises the step of removing a portion of the adhesive layer in registry with the at least one exposed portion of the circuit.

Further according to the invention the substrate is of indefinite length and a plurality of circuits is arranged on the substrate. Preferably, the circuit-bearing substrate is wound into a roll. The completed labels with the microchips can also be positioned on an indefinite length release layer which is then wound into a roll. Preferably, the release layer with the completed circuits is wound loosely at a relatively low tension to minimize damage to the microchips.

In a preferred embodiment, the substrate is separated into individual labels such as through a die cutting process.

Further according to the invention, a label comprises a substrate having on one surface a circuit, a layer of adhesive covering the circuit and the one surface of the substrate, a release layer covering the adhesive layer, and a portion of the release layer has an opening to expose at least a portion of the circuit.

In another preferred embodiment of the invention, the circuit includes at least one microchip and the opening is positioned at the at least one microchip.

In one embodiment of the invention, the circuit is an RFID inlay, including an antenna and a microchip. The antenna can be conductive ink or other conductive material.

In yet another embodiment of the invention, there are multiple microchips in the circuit and multiple openings in the release layer in registry with each of the multiple microchips.

The substrate can be made of any conventional label equipment, including paper, plastic film, or other electrically insulated film.

Further according to the invention, the release layer is of indefinite length and includes a plurality of the labels described above. Preferably, the label-bearing release layer of indefinite length is wound into a roll.

In one embodiment of the invention, the label is imprinted with visible information on one surface of the substrate. The one surface is typically an exposed side of the label so that the printed information is visible when the labels are stripped from the release layer and applied to a final destination surface.

DESCRIPTION OF AN EMBODIMENT OF THE INVENTION

The invention will be described herein and illustrated by the Figures with respect to an RFID label comprising a microchip and antenna, and a method of making the same, which minimizes the potential for damage to the microchip comprising a component of the label. As will be apparent from the forgoing disclosure and the following description of the invention, the invention in its broadest aspects includes other types of electronic labels, and encompasses a method of manufacture of electronic labels having other types of electronic components.

Figure 1:
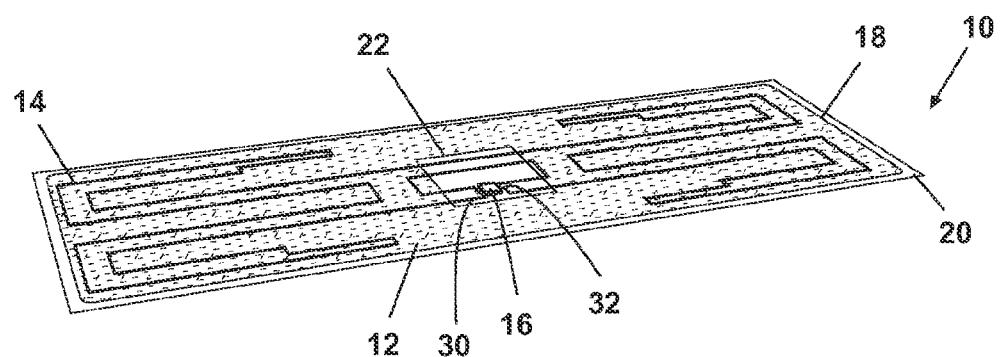
FIG. 1 is a perspective view of an RFID label according to the invention.
Figure 2:
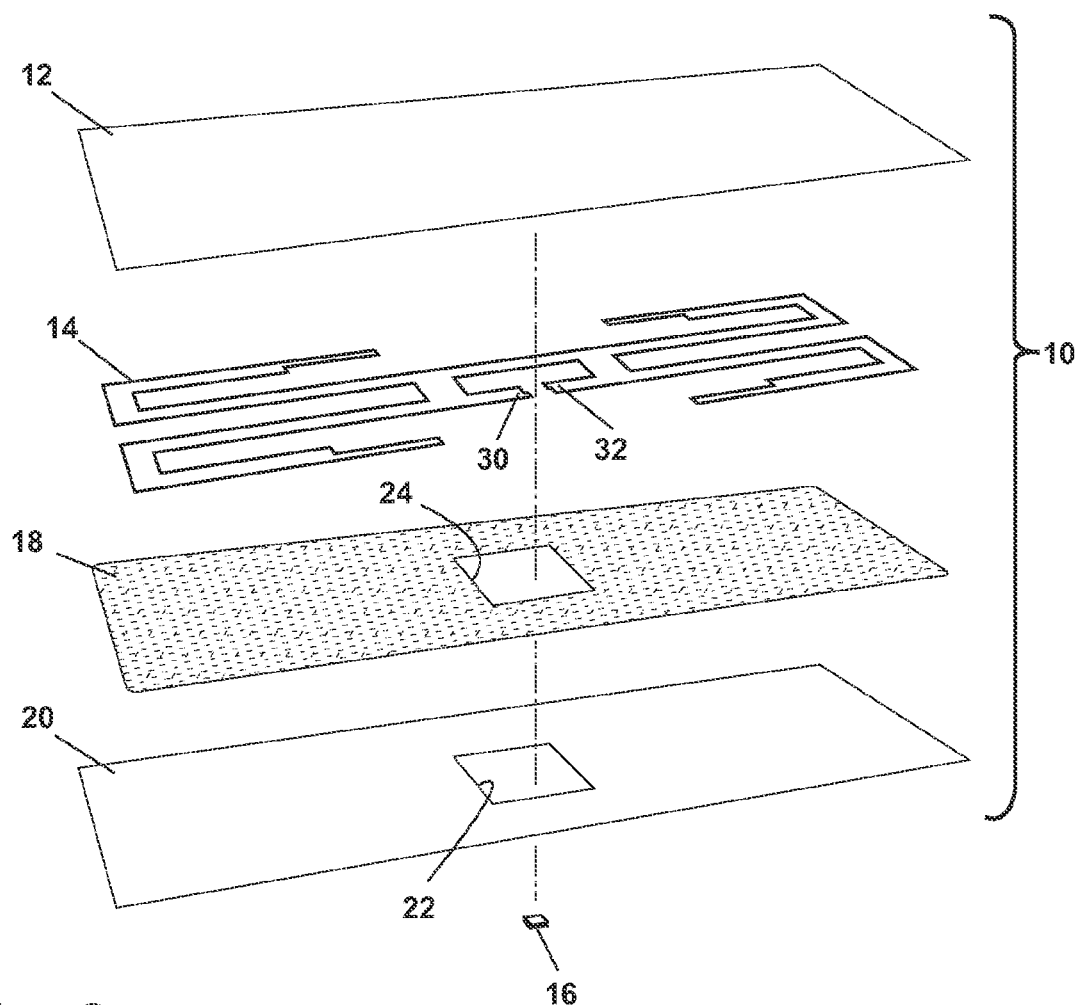
FIG. 2 is an exploded view of the RFID label illustrated in FIG. 1.

Referring specifically to FIGS. 1 and 2, an RFID label 10 according to the invention comprises a thin, flexible label substrate 12 which can be a coated paper, film or similar material suitable for use in a label. Alternatively, the substrate can comprise a more rigid material, such as a circuit board material. An electrical circuit component (also referred to herein as a "circuit"), illustrated as an antenna 14, comprises a thin layer of conductive material, such as a conductive ink, metal foil, sputter-deposited conductive material, and the like, disposed in a preselected configuration suitable for receiving and transmitting radio frequency signals of a preselected frequency over a preselected distance. In a preferred embodiment, the antenna 14 is applied to the substrate 12 through a lithographic process using a commercially-available conductive ink. The antenna 14 is configured with a pair of spaced-apart antenna contacts 30,32. The Figures illustrate an antenna 14 having a preselected configuration for illustrative purposes only. Antennas of differing configuration can be utilized depending on the requirements of a particular application. Additionally, circuits having functionality other than the receipt and transmission of radio frequency signals, can be utilized with the invention described herein.

The RFID label 10 also comprises a thin adhesive layer 18 suitable for adhering to the substrate 12, antenna 14, and container, and a release layer 20 for protecting the adhesive layer 18 until the label 10 is to be applied. Suitable adhesives can include well-known transfer adhesives, spray adhesives, or UV adhesives. The substrate 12, antenna 14, adhesive layer 18, and release layer 20 are disposed in a layered configuration. The substrate 12 can be imprinted with visual information, such as text, graphics, bar coding, other optically-readable information, and the like. Typically, the visual information is imprinted on the substrate 12 subsequent to the application of the antenna 14, adhesive layer 18, and release layer 20 to the substrate 12.

A microchip 16 having data storage, processing, transmitting, and receiving specifications suitable for the purposes described herein is cooperatively disposed with the antenna 14 through the antenna contacts 30, 32. It is anticipated that the microchip 16 will have passive UHF specifications. However, microchips having active UHF specifications, and other devices subject to a risk of damage during a label fabrication process such as a solar chip, a battery, a temperature sensor, and the like, can be incorporated into a label according to this invention. The microchip 16 can be prepared for a "direct die attach," or a "strap attach," as are well-known in the art. As used hereinafter, the term "microchip" will refer to a microchip, a microprocessor, a strap, an interposer, or a similar device adapted for attachment to an antenna.

Figure 3:
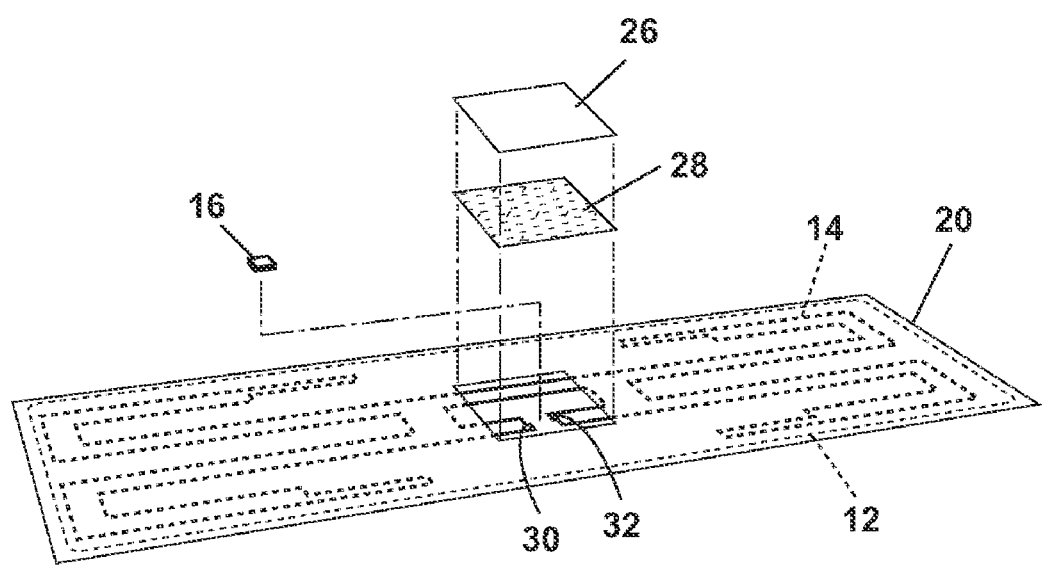
FIG. 3 is an exploded view of the RFID label illustrated in FIG. 1 showing an intermediate step in the fabrication of the label.
Figure 4:
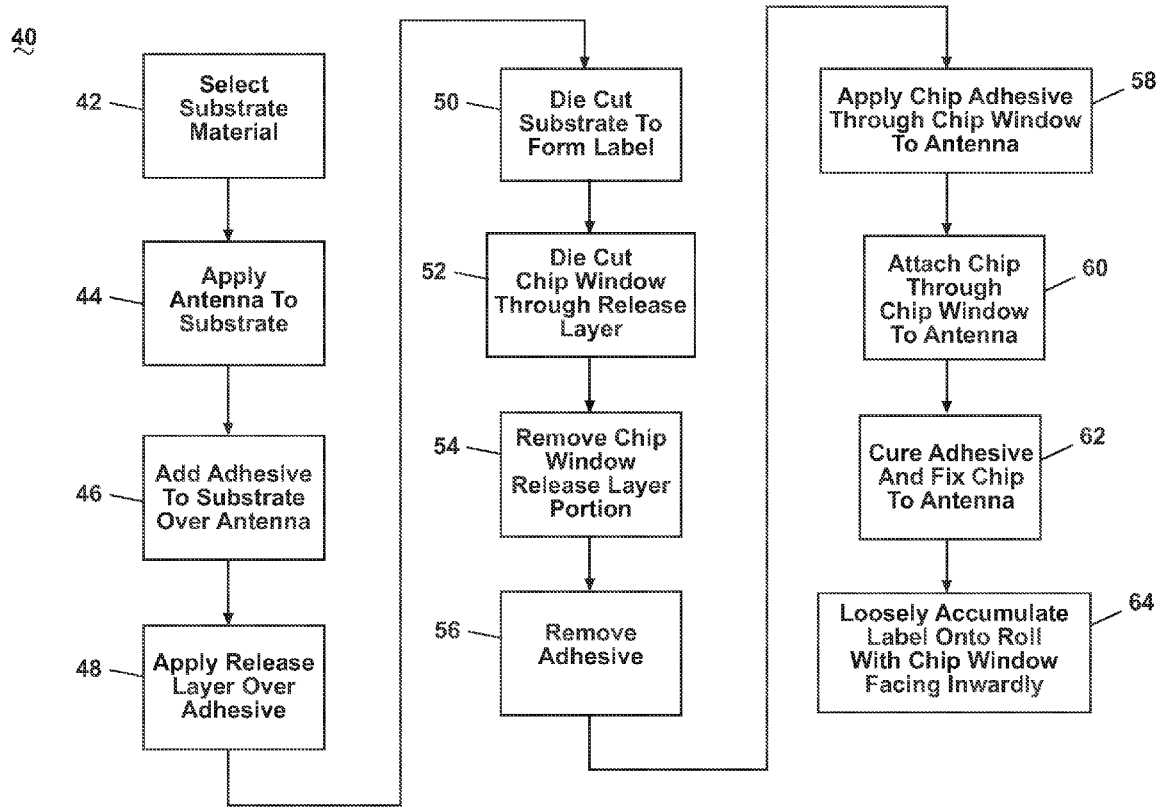
FIG. 4 is a flow chart showing various steps in the fabrication of the RFID label illustrated in FIG. 1.

Referring now to FIGS. 3 and 4, the RFID label fabrication process 40 will be described. FIG. 4 illustrates a series of steps in one embodiment of the label fabrication process. However, certain steps can be modified or eliminated based upon a particular label configuration, adhesive pattern, layer configuration, and the like, as described hereinafter. It is anticipated that the substrate material 12 will be provided as a web of material, and that the following described process will be automated and conducted in a rapid sequence or concurrently on a plurality of labels. However, the process will be described with respect to a single label having a single microchip.

The process 40 is initiated by the selection 42 of a substrate material 12 having suitable properties for the intended label, such as size, durability, color, and the like. The antenna 14 is then applied 44 to the substrate 12 in a preselected configuration. The label adhesive layer 18 is applied 46 over the substrate 12, followed by the addition of a release layer 20. This can be followed by the printing of information or graphics on the substrate material 12.

The substrate material 12 is then separated into individual labels such as through a die cutting process. The die cutting step 50 can form perforations along a separation border for readily separating the labels along the perforations, or can completely separate the labels from each other, or can further cut selvage from the substrate to separate the labels into spaced-apart relationship and the selvage thus cut from the release layer can be subsequently removed from the release layer. Typically, the die cutting step 50 and any selvage removal step are carried out prior to the winding step. The chip windows 22, 24 are cut in the release layer 20 and label adhesive layer 18 through a well known die cutting process. Alternatively, the chip window 22 can be cut in the release layer 20 alone, leaving the adhesive layer 18 intact. The die cutting operation is controlled utilizing any well-known registration method so that the cut does not extend into the antenna 14. The chip window release layer portion 26 is then removed 54. The adhesive portion 28 can also be removed 56 if it is not removed during the removal of the chip window release layer portion 26. Alternatively, if a transfer adhesive is utilized for the adhesive layer 18, the transfer adhesive can be pre-cut with the chip window 24, thereby eliminating step 56, i.e. the separate removal of the adhesive portion 28. Additionally, the chip window die cutting operation can either occur before or after the label cutting operation, or be conducted concurrently with it.

In a "direct die attach" process, a chip adhesive is applied 58 through the chip windows 22, 24 to the substrate 12 intermediate the antenna contacts 30, 32. The microchip 16 is then attached 60 to the antenna contacts 30, 32 by embedding the microchip 16 in the chip adhesive through the chip windows 22, 24. Alternatively, the microchip 16 can supplied with an adhesive already applied, thus obviating the separate chip adhesive application step 58. The label 10 is then positioned intermediate a pair of machine-controlled thermodes which are heated and brought together under carefully controlled conditions of temperature and pressure 62 to cure the adhesive and fix the microchip 16 in the adhesive. Alternatively, the adhesive can be cured by other suitable methods, such as UV curing, and the like.

Alternatively, in order to facilitate the connection of the microchip to the antenna, the microchip (conventionally referred to as a "strap" or "interposer") can be provided with extension leads for connection to the antenna contacts 30, 32. The leads can be configured to enable the microchip to be connected to the antenna 14 without having to precisely position the microchip relative to the antenna contacts 30, 32.

This is followed by loosely accumulating 64 the labels 10 onto a roller with the chip windows 22, 24 facing inwardly, or in a fan-fold configuration. The finished labels 10 can then be removed from the release layer 20 and applied to a carton, pallet, shipping container, and the like.

Alternatively, the adhesive layer 18 can be applied to the substrate 12 under controlled conditions to eliminate adhesive in the area corresponding to the chip windows 22, 24, thus eliminating the need for separate removal of the adhesive portion 28 from the substrate 12. Similarly, the adhesive layer 18 can be applied to the substrate 12 in two strips on either side of the chip window area to eliminate the adhesive in the chip window area. The two adhesive strips can be aligned on the substrate 12 longitudinally or laterally, or can cover predefined areas of the substrate 12, e.g. the corners.

In another embodiment, the adhesive layer 18 and the release layer 20 can be applied over the entire substrate 12, and then a strip of the release layer 20, with or without a strip of the adhesive layer, can be removed to expose the microchip attachment area. The strip can be retained, such as on a roller, while the microchip 16 is attached to the antenna 14 as previously described. The strip can be reapplied to the substrate 12 over the microchip 16 after the attachment and curing processes, followed by accumulating the finished labels 10 onto a roller, or in a fan-fold configuration.

In yet another embodiment, the adhesive layer 18 and the release layer 20 can be applied over the entire substrate 12 on the surface opposite the antenna 14 and the microchip 16. The label 10 as applied will be attached to an item with the antenna 14 and the microchip 16 facing away from the item surface. The microchip 16 will be attached to the antenna 14 in the final step of the label fabrication and printing processes in order to minimize damage to the microchip 16.

The microchip 16 is illustrated in the Figures as located in a central portion of the antenna 14. However, the invention can also be employed with a microchip 16 in any location within the label, or with a plurality of microchips.

The process according to the invention can be carried out in a single or in multiple facilities. For example, the steps of printing and applying the circuits to the substrate, applying adhesive to the substrate, and applying a release layer to the adhesive layer can be carried out at a label conversion facility, and the steps of applying the microchip to the circuit and connecting the microchip to the circuit can be carried out at an electronic manufacturing plant. Typically, the steps of removing a portion of the release layer and the adhesive layer can be carried out at the label converter.

The method of fabricating an RFID label described herein differs from prior art RFID label fabrication methods in that the microchip or strap is incorporated into the label as essentially a last step in the fabrication process. This occurs after the rest of the label has been fabricated, and after printing of the label, thereby minimizing the potential for damage to the microchip caused by the label fabrication and printing processes.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of making at least one electronic label each comprising a circuit component and a microchip in cooperative disposition, the method comprising the steps of:
   attaching the circuit component to a substrate;
   applying an adhesive layer to the substrate over at least a portion of the circuit component;
   applying a release layer over the adhesive layer; and
   forming at least one opening in the release layer to expose at least one portion of the circuit component to allow attachment of the microchip to the circuit component, via the at least one opening.

2. A method of making at least one electronic label according to claim 1 and further comprising the step of depositing at least one microchip in the at least one opening and attaching the at least one microchip to the at least one circuit component portion.

3. A method of making at least one electronic label according to claim 2 wherein the step of forming at least one opening in the release layer comprises forming multiple openings in the release layer and the step of a depositing at least one microchip comprises depositing a microchip in each of the multiple openings.

4. A method of making at least one electronic label according to claim 1 wherein the circuit component is an antenna and the microchip is an RFID chip.

5. A method of making at least one electronic label according to claim 1 and further comprising the steps of removing through the at least one opening a portion of the adhesive layer in registry with the at least one exposed portion of the circuit component.

6. A method of making at least one electronic label according to claim 1 wherein the release layer is of indefinite length and a plurality of circuit components are attached to the substrate.

7. A method of making at least one electronic label according to claim 6 and further comprising the step of winding the circuit-bearing substrate and the release layer into a roll.

8. A method of making at least one electronic label according to claim 6 wherein the substrate is of indefinite length and further comprising the step of die separating the substrate into labels.

9. A method of making at least one electronic label according to claim 6 and further comprising:
   applying the microchips to the circuit components; and
   winding the release layer into a roll subsequent to the step of applying the microchips to the circuit components.

10. A method of making at least one electronic label according to claim 9 wherein the release layer is wound into the roll loosely at a relatively low tension to minimize damage to the microchips.

11. An electronic label comprising:
a substrate having one surface with a circuit component thereon;
a layer of adhesive at least partially covering the circuit component and the one surface of the substrate;
a release layer covering the adhesive layer; and
a microchip attached to the circuit component;
wherein the release layer has an opening exposing at least a portion of the circuit component; and
wherein the opening is positioned at the microchip.

12. An electronic label according to claim 11,
wherein there are multiple microchips attached to respective circuit components; and
wherein there are multiple openings in the release layer in registry with each of the multiple microchips.

13. An electronic label according to claim 11,
wherein the circuit component includes an antenna; and
wherein the antenna and the microchip constitutes an RFID inlay.

14. An electronic label according to claim 11 wherein the circuit component is formed of a conductive ink.

15. An electronic label according to claim 11 wherein the adhesive layer has at least one opening in registry with the opening in the release layer.

16. A roll of electronic labels comprising a release layer of indefinite length and a label according to claim 11.

17. A label formed by the method of claim 1.

18. A roll of labels formed by the method of claim 1.

19. A roll of labels formed by the method of claim 2.

20. A method of making at least one electronic label according to claim 2 wherein the microchip is a strap.

21. A method of making at least one electronic label according to claim 5 and further comprising:
depositing at least one microchip in the at least one opening; and
attaching the at least one microchip to the at least one circuit component portion.

22. A method of making at least one electronic label according to claim 21, wherein the attaching the at least one microchip includes adhesively attaching the at least one microchip to the at least one circuit component portion.

23. A method of making at least one electronic label according to claim 22, further comprising, prior to the adhesively attaching, applying a chip adhesive through the at least one opening.

24. A method of making at least one electronic label according to claim 22, wherein the adhesively attaching includes adhesively attaching the at least one microchip with the chip adhesive previously applied through the at least one opening.

25. A method of making at least one electronic label according to claim 1, wherein the applying the adhesive layer includes not applying adhesive in an area corresponding the at least one opening in the release layer.

26. A method of making at least one electronic label according to claim 1, wherein the forming the at least one opening includes removing a strip of the release layer.

27. A method of making at least one electronic label according to claim 26, further comprising:
depositing at least one microchip in the at least one opening;
attaching the at least one microchip to the at least one circuit component portion; and
subsequent to the attaching the at least one microchip, reapplying the strip of the release layer.

28. A method of making at least one electronic layer according to claim 27, further comprising retaining the strip on a roller during at least some at least one of the depositing the at least one microchip and the attaching the at least one microchip.

29. A method of making at least one electronic label according to claim 1, further comprising cutting the substrate into individual labels.

30. A method of making at least one electronic label according to claim 7, further comprising:
unwinding the circuit-bearing substrate and the release layer; and
inserting at least one microchip in the at least one opening in the release layer.

31. A method of making at least one electronic label according to claim 1, further comprising applying a chip adhesive through the at least one opening.

32. A method of making at least one electronic label according to claim 31, further comprising adhesively attaching the at least one microchip with the chip adhesive previously applied through the at least one opening.

33. A method of making at least one electronic label according to claim 22, wherein the adhesively attaching includes curing the chip adhesive.

34. A method of making at least one electronic label according to claim 1, wherein the attaching the circuit component to the substrate includes printing a conductive ink circuit component to the substrate.

35. A method of making at least one electronic label according to claim 1, further comprising printing information on the substrate after the attaching the circuit component to the substrate, the applying the adhesive layer, and the applying the release layer.

36. An electronic label according to claim 11, wherein the microchip is a strap.

37. An electronic label according to claim 15, further constituting a chip adhesive in the opening in the adhesive layer attaching at least one microchip to the circuit component.

38. An electronic label according to claim 11, wherein the substrate has information printed thereupon.

* * * * *